United States Patent [19]

Swars

[11] Patent Number: 5,411,711
[45] Date of Patent: May 2, 1995

[54] ELECTRICALLY HEATABLE HONEYCOMB BODY, IN PARTICULAR CATALYST CARRIER BODY, WITH INTERNAL SUPPORT STRUCTURES

[75] Inventor: Helmut Swars, Bergisch Gladbach, Germany

[73] Assignee: Emitec Gesellschaft fuer Emissionstechnologie mbH, Lohmar, Germany

[21] Appl. No.: 31,953
[22] Filed: Feb. 1, 1993
[51] Int. Cl.⁶ ............................................. F01N 3/26
[52] U.S. Cl. .................................. 422/177; 60/300; 422/174
[58] Field of Search ............... 422/177, 179, 180, 174; 60/300, 301, 302

[56] References Cited

U.S. PATENT DOCUMENTS

| | | | |
|---|---|---|---|
| 4,928,485 | 5/1990 | Whittenberger | 60/300 |
| 5,140,812 | 8/1992 | Cornelison et al. | 60/300 |
| 5,149,508 | 9/1992 | Bullock | 60/300 |

FOREIGN PATENT DOCUMENTS

| | | |
|---|---|---|
| 0245737 | 11/1987 | European Pat. Off. . |
| 0245737 | 8/1989 | European Pat. Off. . |
| 0245738 | 8/1989 | European Pat. Off. . |
| 3809105 | 2/1990 | Germany . |
| 8907488 | 8/1989 | WIPO . |
| 8910470 | 11/1989 | WIPO . |
| 8910471 | 11/1989 | WIPO . |

Primary Examiner—Timothy M. McMahon
Attorney, Agent, or Firm—Herbert L. Lerner; Laurence A. Greenberg

[57] ABSTRACT

A honeycomb body includes an interior, two end surfaces, cross-sectional regions and a cross-sectional plane. At least partly structured sheet metal layers form a multiplicity of channels through which a fluid can flow. The channels extend from one of the end surfaces to the other. An insulating device subdivides the honeycomb body and extends from one of the end surfaces to the other for reducing electrical conductivity of the honeycomb body in each of the cross-sectional regions and developing at least one wound, electrically cohering conductive current path extending in the cross-sectional plane. Primarily metal support structures extend at least partly in the interior of the honeycomb body and retain the sheet metal layers. The insulating device may be at least one planar gap and the support structures may be stabilizers of the at least one planar gap extending at least intermittently parallel to the at least one planar gap, and/or the insulating device may be electrically insulating layers and the support structures may be carriers of the electrically insulating layers extending inside the electrically insulating layers.

39 Claims, 6 Drawing Sheets

FIG 8

ELECTRICALLY HEATABLE HONEYCOMB BODY, IN PARTICULAR CATALYST CARRIER BODY, WITH INTERNAL SUPPORT STRUCTURES

CROSS-REFERENCE TO RELATED APPLICATION

This application is a Continuation of International Application Ser. No. PCT/EP91/01328, filed Jul. 15, 1991.

SPECIFICATION

The present invention relates to an electrically conductive and therefore heatable honeycomb body, in a form in which it can be used in particular to lower pollutants expelled in a cold-starting phase of an Otto engine in motor vehicles.

One such honeycomb body is known from Published International Application WO 89/10470 corresponding to U.S. Pat. No. 5,146,743 or Published International Application WO 89/10471 corresponding to U.S. application Ser. No. 604,199, filed Oct. 25, 1990, for instance. In particular, those disclosures show exemplary embodiments with stacks of metal sheets wound in an S-shape (also known as contrarily wound stacks) in which electric contacting is carried out through external half shells. As has been demonstrated, when the honeycomb body is acted upon by high electric currents, that type of contacting leads to a not entirely uniform distribution of the currents over the honeycomb body. The mechanical stability under heavy operating strains is also not always satisfactory, because the electrically insulating layers present in the interior of the honeycomb body cannot absorb arbitrary mechanical strains. Those disclosures also describe a honeycomb body form in which all of the metal sheets are secured in the shape of a U to an internal support wall. That support wall includes electrically conductive segments interrupted by electrically non-conductive segments. As a result, the support wall, which has a basic substance that is primarily of electrically non-conductive material such as ceramic, cannot absorb arbitrary mechanical tensile forces, and joining it to a metal jacket tube is difficult.

European Patent No. 0 245 737 B1 corresponding to U.S. Pat. Nos. 4,832,998 and 4,923,109, and European Patent No. 0 245 738 B1 corresponding to U.S. Pat. Nos. 4,803,189 and 4,946,822 are also significant in order to comprehend the present invention and as prior art, because those disclosures describe the typical advantages of the honeycomb bodies made of contrarily wound sheet-metal stacks and those having internal support walls.

It is accordingly an object of the invention to provide an electrically heatable honeycomb body, in particular a catalyst carrier body with internal support structures, which overcomes the hereinafore-mentioned disadvantages of the heretofore-known devices of this general type, which is especially strong mechanically and is simple to manufacture, which simultaneously allows uniform impressing of electrical current upon the entire honeycomb body, in which the electrical resistance of the honeycomb body can be increased as compared with conventional monolithic honeycomb bodies, and which can be adjusted within wide limits by simple structural provisions or by the way in which individual parts are dimensioned.

With the foregoing and other objects in view there is provided, in accordance with the invention, a honeycomb assembly, comprising a honeycomb body, the honeycomb body having an interior, two end surfaces, cross-sectional regions and a cross-sectional plane; at least partly structured sheet metal layers forming a multiplicity of channels through which a fluid can flow, the channels extending from one of the end surfaces to the other; insulating means subdividing the honeycomb body and extending from one of the end surfaces to the other for reducing electrical conductivity of the honeycomb body in each of the cross-sectional regions and developing at least one wound, helical or spiral electrically cohering conductive current path extending in the cross-sectional plane; and primarily metal support structures extending at least partly in the interior of the honeycomb body and retaining the sheet metal layers; the insulating means being at least one planar gap and the support structures being stabilizers of the at least one planar gap extending at least intermittently parallel to the at least one planar gap, and/or the insulating means being electrically insulating layers and the support structures being carriers of the electrically insulating layers extending inside the electrically insulating layers.

Continuous metal support structures which protrude into the interior of the honeycomb body make stable, mechanically loadable suspension of all of the metal sheets possible. Suitable dimensioning of the support structures and suitably selected contacting with the metal sheets simultaneously provide a more-uniform distribution of an electrical current in the honeycomb body if a voltage is applied. While the electrical current looks for the shortest possible path through the honeycomb body in contacting in accordance with the prior art, which leads to greater strain on the strips located on the inside in the case of curved sheet-metal layers, this can be largely equalized by purposeful contacting of the metal sheets with the support structures.

In accordance with another feature of the invention, a first part of the support structures is electrically highly conductively connected to one another and to a first terminal contact and a second part of the support structures is electrically highly conductively connected to one another and to a second terminal contact, wherein the first part of the support structures is electrically conductively connected to the second part of support structures only through at least one current path extending through the sheets. As will be explained in further detail below in conjunction with the drawing, the simultaneous mechanical and electrical function of the support structures has special advantages for the present invention.

In accordance with a further feature of the invention, the honeycomb body, which is suspended practically only from the support structures, can be disposed inside a jacket tube but electrically insulated from it, with the sheets being connected to the jacket tube only through the support structures. Although in principle it is also possible in the present invention to conductively join the jacket tube to one of the electric supply lines, nevertheless for the sake of greater freedom in later incorporating it into an electrical supply system it is especially advantageous if there is no electrical connection with the jacket tube. The jacket tube then serves only as a protective sheath and as a load-bearing connecting element, for example for connection to other parts of an exhaust system in the case of a motor vehicle.

In accordance with an added feature of the invention, the support structures are passed in an electrically insulated manner through the jacket tube and/or they are secured to it, preferably form-lockingly. A form-locking connection is one which connects two elements together due to the shape of the elements themselves, as opposed to a force-locking connection, which locks the elements together by force external to the elements. The support structures extended to the outside can be constructed directly as terminal contacts, for example with the option that supply lines constructed for high currents can be screwed or slipped onto these contacts.

In accordance with an additional feature of the invention, the metal sheets are disposed substantially in one or more stacks bent approximately in an S shape. The term "S shape" is understood to mean the contrarily wound form known from the prior art, which is always similar to an S, at least in its inner region. With that shape, very varied cross sections, particularly round, oval or elliptical cross sections, can be filled in an advantageous way from a manufacturing standpoint, and virtually arbitrary desired electrical resistances can be established by varying the thickness of the sheet-metal stack and by means of electrically insulating intermediate layers. In the present invention, a modification of the known S shapes is preferably used, because it is especially advantageous. In it the sheet-metal layers do not extend to the periphery but rather are bent back upon themselves more markedly and terminate at internal support structures. From the manufacturing standpoint, this is advantageous in certain cases, although the invention is not limited to this special embodiment. In principle, the stack need not be formed of individual metal sheets either, but instead can be formed of a self-contained coil wound in an S shape, as is described in German Patent DE 38 09 105 C2, corresponding to U.S. Pat. No. 5,133,944, for instance.

In accordance with yet another feature of the invention, with regard to the S-shaped course of the metal sheets, the electrically insulating gaps and/or layers result in a current path substantially following the stack or stacks of sheets singly or multiply in approximately an S shape.

In this way, by varying the dimension of the sheet-metal stack and the number of S-shaped courses, the electrical resistance can be advantageously adjusted within wide limits for this particular application.

In accordance with yet a further feature of the invention, the metal sheets secured to the support structures in the interior of the honeycomb body are secured to or merged with the support structures, preferably at angles that differ from 90°. In principle, the support structures need not always be separate metal sheets. Instead, the support structures may, for instance, be entirely or partly formed of lengthened ends of metal sheets that are bundled together into a tight package, so that an additional connecting technique and additional structural parts are not absolutely necessary. In most cases, however, it will be advantageous for the support structures to be made of separate metal sheets and for the sheets forming the honeycomb body to be secured to it by joining techniques, in particular brazing. As will be explained in further detail in conjunction with the drawing, for most cross-sectional shapes to be filled it is advantageous if the sheets forming the honeycomb body converge obliquely upon the support walls, and in many cases it is also advantageous if the support structures are curved along the insulating means.

As will also be explained below in conjunction with the drawing, especially FIG. 3, since the support structures are simultaneously electrical connections, they should enable uniform impressing with electrical current. This may require adapting the electrical conductivity of the support structures within various regions, which can be performed by locally, suitably selected sheet-metal thicknesses. In principle, the support structures under certain circumstances may also be established with a thickness that varies continuously in accordance with current conditions, but in most cases a compromise, for example with only two or three different sheet-metal thicknesses, will also be possible. Therefore, in accordance with yet an added feature of the invention, the support structures have a local electrical resistance adapted to local current intensities to be absorbed, permitting individual subregions of the support structures to have different thicknesses.

In accordance with yet an additional feature of the invention, the primarily metal support structures in the interior of the honeycomb body effect the electrical subdivision primarily by means of gaps. In the prior art, a subdivision by means of gaps would hardly be mechanically stable, because elongated structures capable of vibrating are created if the subdivisions are electrically appropriate. In the case of the typical mechanical strains in a motor vehicle resulting from pressure surges in the exhaust system and from jarring as a result of vehicle motion, such a body would be destroyed after a brief period of operation, and electrical short circuits would also be virtually unavoidable. Through the use of relatively thick, mechanically stable support structures, however, it is possible for even elongated segments of the honeycomb body to be supported by support structures extending along these sections so stably, that neither electrical short circuits or mechanical overloads occur. The gaps can be kept so narrow that they do not impair the function of the honeycomb body. For example, the size of the gaps may have a similar order of magnitude to the structural height of the individual sheets or to the spacing between the sheet-metal layers. In individual, particularly critical regions, or at points that can be very closely approached by support structures of variable electrical potential, additional electrically insulating layers may be provided.

In accordance with again another feature of the invention, in order to mount electrically insulating layers in a honeycomb body, these layers are applied to one or both sides of the support structures, preferably in the form of a flame-sprayed ceramic layer. While it is very difficult to apply electrically insulating layers on very thin sheets of the kind normally used to form honeycomb bodies, it is relatively simple to apply such layers to solid metal sheets of the kind used for the support structures. Examples of suitable techniques for very stable layers are flame spraying, plasma spraying and detonation coating. Electrically insulating intermediate layers, for example in the form of ceramic fiber mats or the like, can be dispensed with entirely.

In the construction of honeycomb bodies according to the invention, the fact that such honeycomb bodies require relatively low voltages for electrical heating, such as 12 or 24 V that are available in motor vehicles, has an advantageous effect. This means that the demands made of insulating means are far less stringent than in systems with higher voltages. Moreover, the primary application for such honeycomb bodies is heating in the cold starting phase in motor vehicles, so that the electrical insulation need be effective only up to a certain temperature, such as 300°C., while short circuits that might later occur at higher temperatures and/or in later jarring as a result of thermal expansion or vibration no longer have any disadvantageous effect, because by then the honeycomb body is no longer being acted upon by electrical voltage.

As will be described in detail in conjunction with the drawing, in order to achieve an adequately high resistance it is not always adequate to form merely a single S-shaped current path in the honeycomb body. In accordance with again a further feature of the invention, doubling the length of the current path while simultaneously doubling the resistance per unit of length can be attained in an S-shaped wound stack by providing a gap or an electrically insulating layer instead of or parallel to a middle sheet-metal layer; all of the metal sheets are electrically conductively joined together on a first end of the stack, while on the other end of the stack, half the sheets, on one side of the central insulation, are connected to a first terminal contact through a first supporting connection structure, and the other half of the sheets, on the other side of the central insulation, are connected to a second terminal contact through a second supporting connection structure. Besides the increased electrical resistance, this configuration has the additional advantage of having both terminal contacts disposed on the same side of the honeycomb body, preferably close together, which can make it easier to install the honeycomb body in an exhaust system.

In accordance with again an added feature of the invention, in order to increase the stability, the electrically conductive connection at the first end of the stack is provided by means of a load-bearing bridging structure, which is secured to or supported on the jacket tube in an electrically insulated manner. With regard to its mechanical stability, this honeycomb body is no different from an .S-shaped stack without an additional electrical subdivision.

In accordance with again an additional feature of the invention, it is advantageous in terms of the current distribution in the honeycomb body for the support structures in subregions to each enclose a plurality of layers of metal sheets, forming a beak-like feature, for electrical contacting purposes. In the case of curved stacks of metal sheets, this kind of beak-like contacting makes it largely possible to prevent currents from being concentrated substantially in the inner region of the curvature. A beak-like enclosure of the sheets is also especially stable mechanically.

Despite the stabilization of the entire body by support structures, vibration can occur all the way in the interior of the body unless additional provisions are made. In accordance with still another feature of the invention, these vibrations can be suppressed or at least greatly reduced by providing the support structures, at least in subregions and preferably in subregions located far away from the outer periphery of the honeycomb body, with reinforcement tabs, which protrude beyond one or both end surfaces of the honeycomb body and do not touch the end surface or surfaces and which are supported on one another and/or on the jacket tube in an electrically insulated fashion. Such supports then not only avoid vibration but can also assure that electrically insulating gaps are maintained. There are various possibilities available as to the type of support, such as the embodiment of a stable ring in front of one or both end surfaces, or the support on the jacket tube in every desired direction.

In accordance with still a further feature of the invention, the metal sheets include alternating smooth and corrugated metal sheets which are known for such bodies or alternatingly disposed differently corrugated or structured sheets. Any other form of structuring of the sheet-metal layers that is suitable for honeycomb bodies can also be employed. At least when used in the exhaust system of motor vehicles, high-temperature and corrosion-proof steels are considered appropriate as the material.

In accordance with still a further feature of the invention, the honeycomb body is used as a heatable catalytic converter, so that coating it completely or partially with catalytically active material is preferred. Since this kind of heated catalytic converter is intended primarily to affect performance in the cold starting phase, its catalytically active coating can also differ from that of a typical catalytic converter in the sense that a primarily oxidizing coating is used, such as a vapor-deposited coating of platinum and/or rhodium.

In accordance with still an added feature of the invention, the honeycomb body is used in electrical systems in motor vehicles, and an appropriate range for the electrical resistance of such a honeycomb body at 20° C. is from 0.01 to 0.3 $\Omega$, preferably 0.025 to 0.1 $\Omega$, and in particular approximately 0.02 $\Omega$. Based on recent developments, it can be assumed that such a honeycomb body should reach a temperature of 250° to 300° C. within a few seconds, and therefore current intensities of over 400 A are entirely possible. The precise current intensities that occur in such a honeycomb body depend considerably on the internal resistance of a current source being used and on the resistance of the supply lines, so that it cannot be assumed that such a honeycomb body will be constantly supplied with the rated voltage of a supply system. In order to nevertheless assure fast enough heating, a correspondingly low resistance must be selected that allows currents of 400 to 800 A, for instance.

In accordance with still an additional feature of the invention, proportions of thickness of the honeycomb body are provided by using typical metal sheets for such honeycomb bodies having a thickness of from 0.03 to 0.06 mm, while the support structures may have a thickness of from 0.5 to 1.5 mm and preferably approximately 1 mm. Portions of the support structures that locally need to absorb only limited current intensities may also have a thickness of only 0.2 to 0.8 mm and preferably approximately 0.5 mm.

In accordance with a concomitant feature of the invention, the honeycomb body is used as a heated catalytic converter upstream of a main catalytic converter, and its diameter is greater than the spacing between the end surfaces. A relatively thin disk of this construction can be integrated along with a main catalytic converter in a common jacket tube. However, in principle, the invention allows other arbitrary dimensionings and proportions between the diameter and the spacing of the end surfaces.

Other features which are considered as characteristic for the invention are set forth in the appended claims.

Although the invention is illustrated and described herein as embodied in an electrically heatable honeycomb body, in particular a catalyst carrier body, with internal support structures, it is nevertheless not intended to be limited to the details shown, since various modifications and structural changes may be made therein without departing from the spirit of the invention and within the scope and range of equivalents of the claims.

BRIEF DESCRIPTION OF THE DRAWINGS

The construction and method of operation of the invention, however, together with additional objects and advantages thereof will be best understood from the following description of specific embodiments when read in connection with the accompanying drawings.

Figure 1:
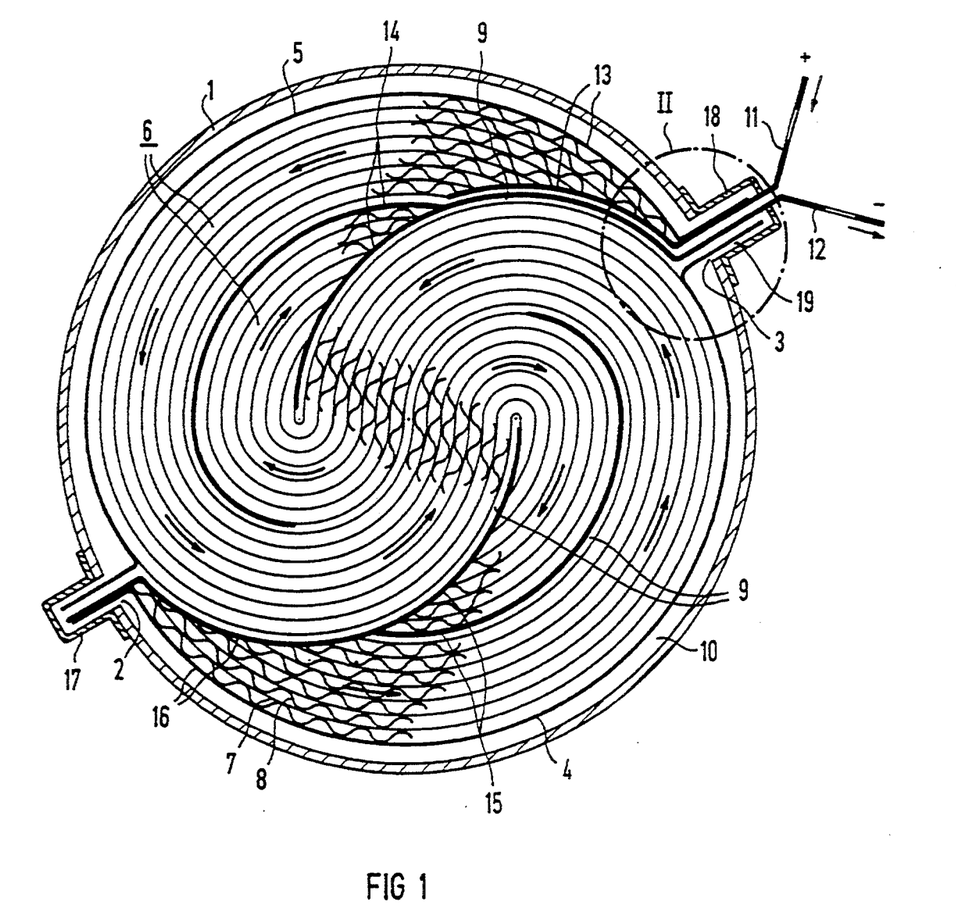
FIG. 1 is a diagrammatic, cross-sectional view of a honeycomb body according to the invention, with a double S-shaped current path.

Referring now to the figures of the drawing in detail and first, particularly, to FIG. 1 thereof, there is seen a jacket tube 1 with lengthwise slits 2 and 3 formed therein (which can also be seen in perspective in FIG. 5), in which a wound stack 6 of alternatingly disposed smooth metal sheets 7 and corrugated metal sheets 8 is accommodated. The sheet stack 6 does not touch the jacket tube itself but instead is supported by support structures 13, 14, 15, 16. From a production standpoint and for current distribution in the honeycomb body when it is acted upon by electric current, it is advantageous if the wound sheet stack 6 is fastened in place by two half-shells 4, 5, which permit an electrically insulating fastening to the jacket tube 1 by means of angled ends. The other support structures also have bent ends of this kind, which protrude to the outside through the slits 2, 3 in the jacket tube 1. The honeycomb body itself is electrically subdivided by electrically insulating gaps 9, and the support structures 13, 14, 15, 16 extend along these gaps and reach far into the interior of the honeycomb body. In this way, the support structures 13, 14, 15, 16 stabilize the metal sheets so greatly that the gaps can serve as insulation means without additional provisions being taken. As is seen in FIG. 3, remaining partial gaps 22 in the interior of the honeycomb body, which are not directly stabilized by support structures, are also kept stable by the rigidity of the body in the remainder of the region.

Figure 2:
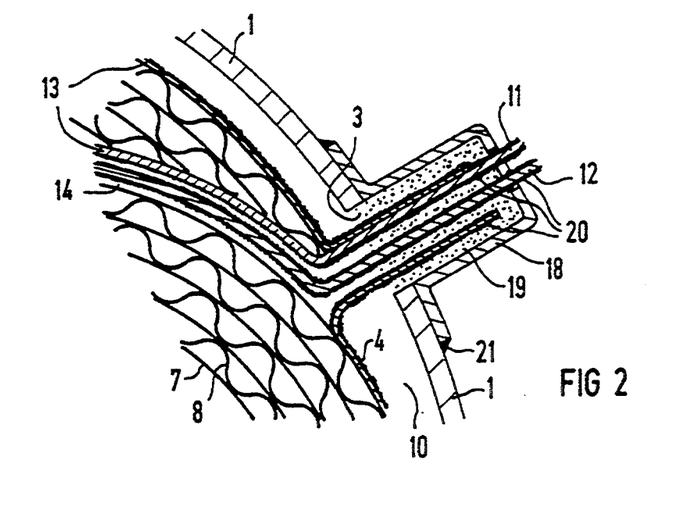
FIG. 2 is an enlarged, fragmentary view of a portion II of FIG. 1, which is namely a duct for leading connection structures through a jacket tube.
Figure 3:
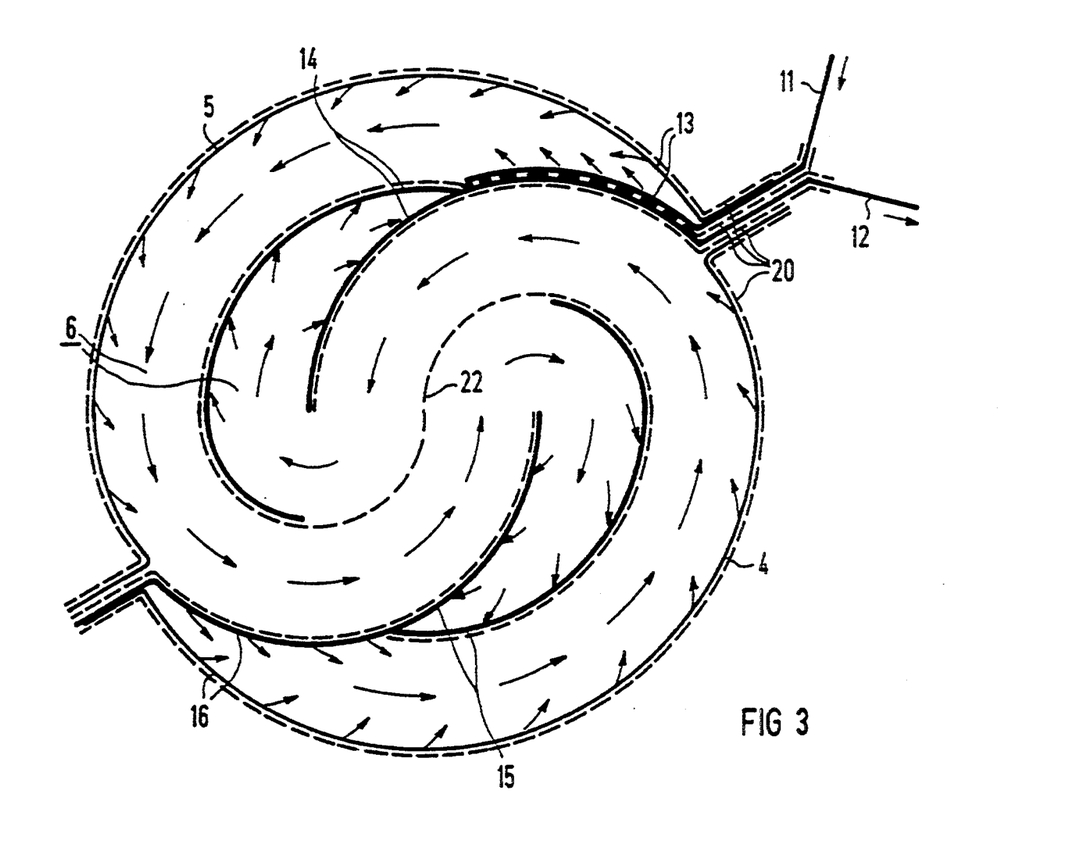
FIG. 3 is a cross-sectional view showing a distribution of electric current in a honeycomb body according to the invention.

As can also be seen from the supplementary FIGS. 2 and 3, the support structures 13, 14, 15, 16 must be electrically insulated from one another at least in a ducting region through the slits 2, 3 in the jacket tube 1. An electrical insulation of this kind may also be advantageous as an additional provision in the region of the gaps 9. The electrical insulation can be provided especially simply by means of a ceramic layer 20 applied over portions of the structures 13, 14, 15, 16 and optionally over portions of the half-shells 4 and 5 as well, in each case on the sides toward which an electrical insulation is desired. This layer can advantageously be produced by flame spraying. This also represents a major advantage of the present invention, because electrically insulating layers need not be incorporated in the form of separate layers, which would involve problems of mechanical stability. The very thin metal sheets that form the actual honeycomb structure need not be coated either, which would again be very difficult. In contrast, the relatively thick support structures 4, 5, 13, 14, 15, 16 can be prefabricated in their final form without difficulty and can be provided with applied ceramic layers on the desired sides. As long as a gap 10 between the half-shells 4, 5 and the jacket tube 1 is sufficiently large, it is unnecessary to provide an additional insulation there. However, if the half-shells 4, 5 are provided with reinforcements in the form of beads on the outside, such as for stability reasons, then an at least partially insulating coating on the outside of the half-shells 4, 5 or on the inside of the jacket tube 1, would be advantageous. The fixation of the support structures in the slits 2, 3 in the jacket tube 1 is preferably performed by means of a closed retaining cap 17 and a slit retaining cap 18, which are metallically joined to the jacket tube, preferably by weld seams 21. The angled ends of the support structures must be insulated from one another and from the retaining caps 17, 18 in the interior of the retaining caps in accordance with electrical conditions, which can sometimes be achieved by coatings. The mechanical fixation is therefore advantageously performed by means of a form-locking clamping action, in which the retaining caps 17, 18 are pressed together in corrugated or zig-zag form with the metal sheets located inside them. Since it is closed, the cap 17 is tight without additional provisions being taken, while in all interstices 19 that might possibly remain in the slit cap 18, a swelling material is pressed in along with it for sealing purposes. Swelling materials of this kind are formed of mica fibers, for instance, which always refill any voids created by crystalline restructuring. First and second terminal contacts or ends 11, 12 of the support structures 13, 14 protrude from the slit cap 18. As is indicated by arrows in FIGS. 1 and 3, an electric current can flow through the honeycomb body over a double S-shaped path. This current (this description assumes a direct current) flows from the first terminal contact 11 through the support structure 13 into the upper half of the sheets 7, 8 of the stack 6. The support structure 13 encloses this end, forming a beak-like feature, and the half-shell 5 represents a continuation of this enclosure. In this way, the flow of current can be introduced very uniformly into the body. The current flows along the arrows to the support structure 15 which is beak-like, and together with the support structure 16 which is also beak-like, the structure 15 forms a bridge between the two halves of the sheet stack 6 at one end, so that the current in the second half of the sheets 7, 8 can flow back to the support structure 14, from where it reaches the second terminal contact 12. In FIG. 3, small arrows in particular illustrate the effect of the support structures 13, 14, 15, 16, which protrude deep into the interior, and of the half-shells 4, 5, upon the current distribution. The insulating gaps 20 and the layers or coatings 22 are represented by dashed lines. It can be seen particularly clearly from FIG. 3 that because of the absence of support structures all the way inside the honeycomb body, where a free gap 22 is located, all the currents have to pass through the sheets 7, 8 of the stack 6, so that precisely in this region a very uniform flow of current is attained, which leads to uniform heating.

It should be noted that the course of the current in a double S shape is merely one special exemplary embodiment of the present invention. In the event that the honeycomb body is allowed to have a low resistance, then a single S-shaped current course is sufficient, so that in that case a gap in the interior of the stack 6 could be dispensed with, and the support structures 13, 14 could serve in common as a current supply line while the support structures 15, 16 could serve in common as a current derivation line. In that case, however, the electrical terminals would not be next to one another on one side of the honeycomb body but rather on opposite sides.

Figure 4:
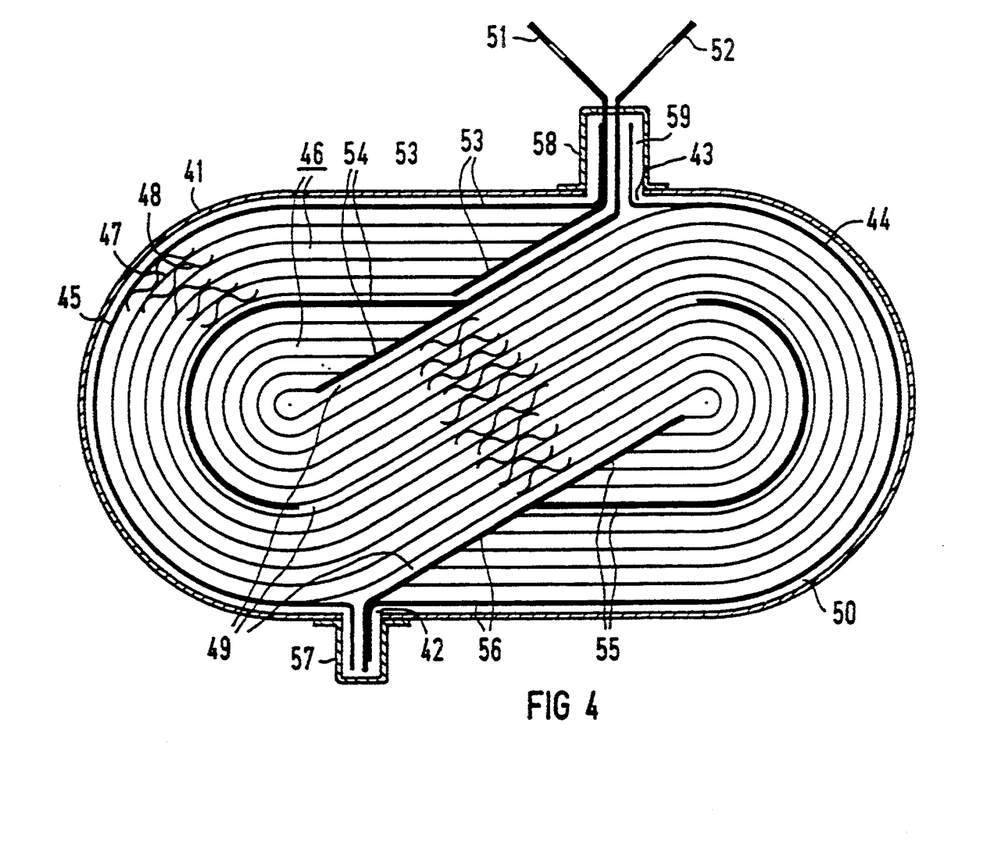
FIG. 4 is a cross-sectional view of an exemplary embodiment of the invention in the form of an oval honeycomb body.

FIG. 4 shows a honeycomb body with an oval cross-sectional form, which is constructed quite similarly to FIG. 1 electrically. All of the above remarks apply appropriately to this embodiment as well. This body again has a jacket tube 41 with slits 42, 43, in which an S-shaped stack 46 of smooth sheets 47 and corrugated sheets 48 is accommodated. This stack of sheets is fastened in place by slightly asymmetrical half-shells 44, 45 and is retained on support structures 53, 54, 55, 56. Through the use of gaps 49, the body is electrically subdivided into two internested S-shaped layers which together form the electrical current path. The stack 46 is separated from the jacket tube 41 by a gap 50 and is secured to the jacket tube, specifically by the support structures 53, 54, 55, 56 in retaining caps 57 and 58, in an electrically insulated manner. The support structures 53 and 54 terminate at terminal contacts 51, 52, and remaining interstices 59 in the retaining cap 58 may be filled out in a sealing manner by means of a swelling material.

Figure 5:
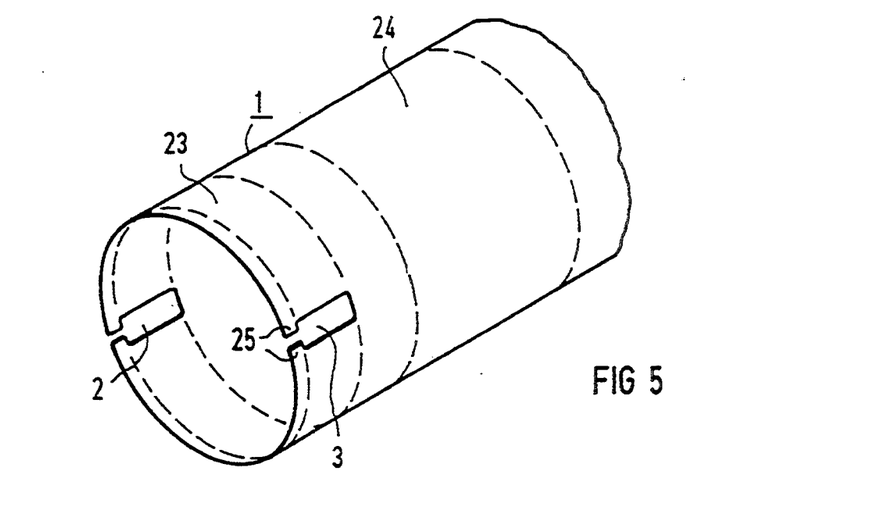
FIG. 5 is a fragmentary, perspective view showing space conditions when a honeycomb body according to the invention is used as a heatable preliminary catalytic converter upstream of a main catalytic converter in a shared jacket tube.

The perspective view of FIG. 5 shows the upstream part of a jacket tube 1, which is prepared for receiving a honeycomb body according to the invention. The ends of the support structures of such a honeycomb body can be inserted into the slits 2 and 3, and the outer ends of the slits 2 and 3 may be limited by mounting tabs 25, which are bent open before a honeycomb body is inserted and are then bent back into their original position. Such tabs may also be dispensed with, however, if the closure of the gap is effected by means of a suitably shaped retaining cap. Dashed lines in FIG. 5 show a later installation position 23 for a honeycomb body according to the invention. Dashed lines also show a later installation position 24 of a downstream main catalytic converter, which may preferably be disposed in the same jacket tube 1, in order to lessen the overall expense both in production and in later installation.

Figure 6:
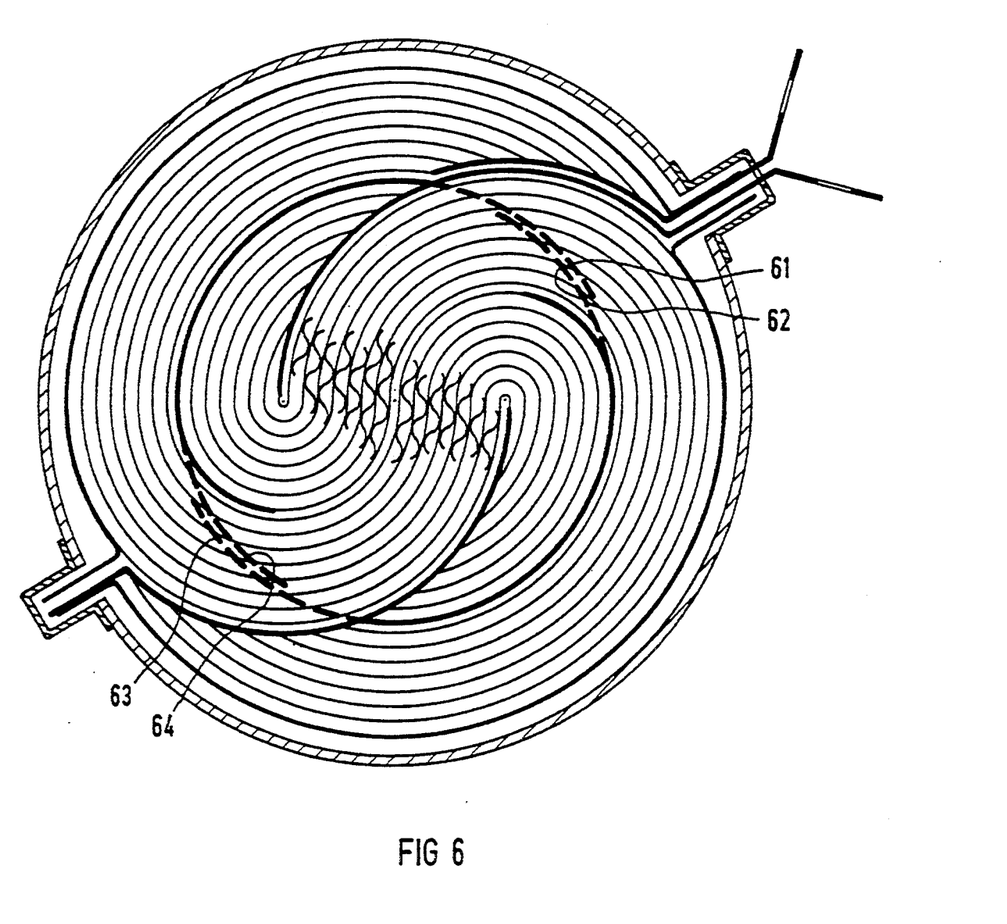
FIGS. 6, 7 and 8 are cross-sectional views showing various options for the placement of reinforcement tabs for stabilizing the honeycomb body, which protrude beyond the end surfaces of the honeycomb body.
Figure 7:
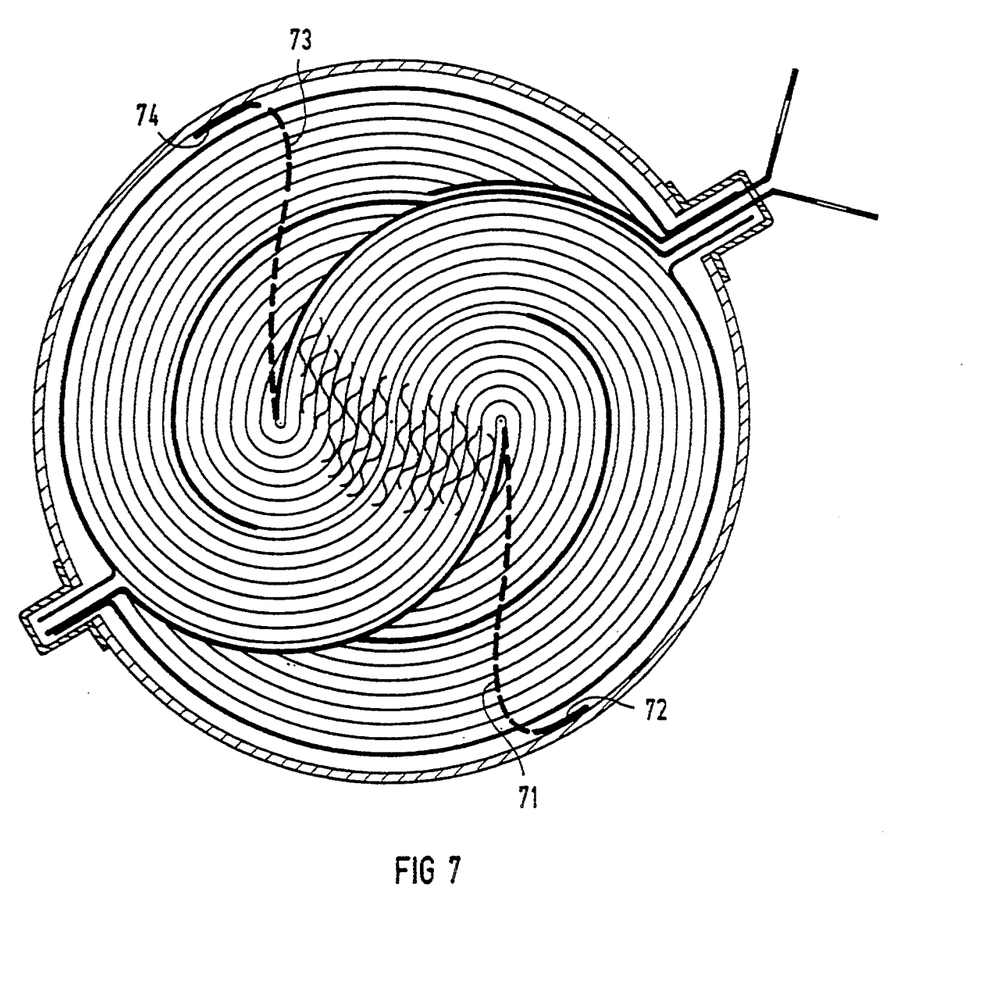
Figure 8:
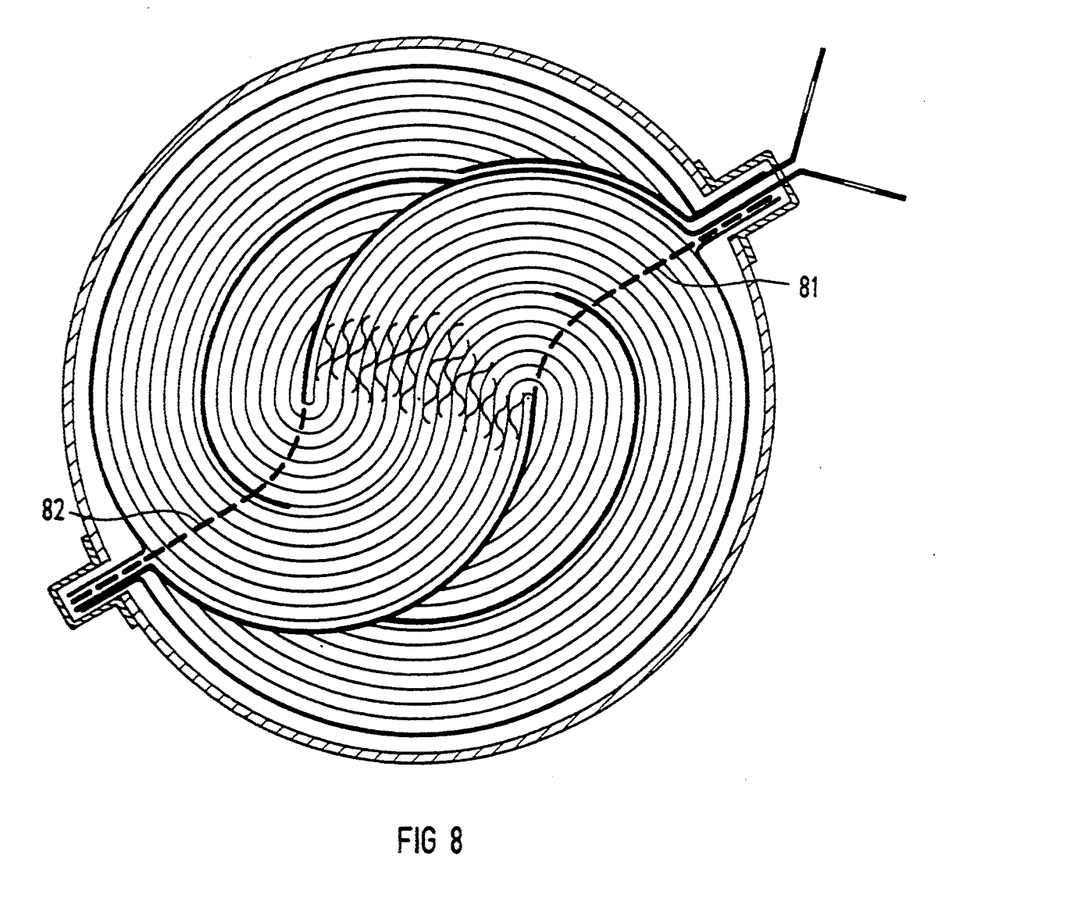

FIGS. 6, 7 and 8 show various options for stabilizing honeycomb bodies according to the invention or for suppressing vibration in applications involving especially high mechanical strain. In all of the drawing figures, dashed lines indicate structures that are located in front of and/or behind the end surfaces of the actual honeycomb body. Such structures can already be provided during the manufacture of the support structures, by widening the support structures or forming tabs protruding from them, which involve virtually no additional production effort or expense.

In FIG. 6, such reinforcement tabs 61, 62 and 63, 64, which protrude beyond the end surfaces of the honeycomb body, together with an inner part of the support structure of the honeycomb body which may likewise protrude beyond the end surfaces, form a kind of ring, which effects especially high stability of the internal parts of the honeycomb body with respect to vibration. Taking the electrical conditions into account, the reinforcement tabs 61, 62, must be joined together in such a manner that they are electrically insulated from one another but are firmly joined mechanically, which can be achieved by means of suitable ceramic coatings and a form-locking connection, such as clamping. The same is true for the reinforcement tabs 63, 64. The reinforcement tabs 61, 62, 63, 64 must also not touch the sheets of the honeycomb body, so that the electrical conditions can be adhered to. This kind of ring in front of and/or behind the end surface of a honeycomb body is no particular hindrance to its use, because the usual configurations for carrying a flow to such honeycomb bodies already have sufficient free space. A reinforcement ring of this kind also need not have a great length in the direction of the channels of the honeycomb body, so that a depth of approximately 1 cm, for instance, is adequate.

In FIG. 7, the stabilization is effected by reinforcement tabs 71, 73, which support internal parts of the support structure against the jacket tube. These reinforcement tabs 71, 73 also extend in front of and/or behind the end surfaces of the honeycomb body without touching it. They are secured to the jacket tube in an electrically insulated manner at fastening points 72, 74, for instance by means of straps. This exemplary embodiment has the advantage of distributing the securing or support points of the honeycomb body over the circumference of the jacket tube, so that vibration is suppressed to a pronounced extent and the body is especially well stabilized. This type of support relieves the support structures.

From a production standpoint, however, reinforcement tabs 81, 82 as shown in FIG. 8 are simpler. The ends of these reinforcement tabs can be secured in the retaining caps simultaneously with the other support structures, while taking electrical insulation conditions into account. This embodiment again increases the stability very markedly, because the reinforcement tabs 81, 82 in combination with the support structures form stable bridges from one side of the jacket tube to the other, with these bridges extending in the region of the dashed lines in front of and/or behind the end surfaces of the honeycomb body.

Honeycomb bodies according to the invention can be produced relatively easily by prefabricating the support structures and providing them with an insulating coating where necessary. The structured metal sheet can then be inserted relatively easily into the prefabricated support structure and put in the desired shape by contraction of the half shells. Insertion into slits in the jacket tube, slipping the retaining caps on, and compressing the retaining caps into form-locking, mechanically firm connections, possibly with welding of the retaining caps to the jacket tube, take place at the very end of the production procedure. The structured metal sheets can optionally be brazed to one another and to their retaining structures, in the usual manner. Next, depending on the application, the honeycomb body can be entirely or partially provided with a catalytically active coating. One major application for honeycomb bodies according to the invention is their use as heated catalytic converters, which lower the expulsion of pollutants for motor vehicles in the cold starting phase, because they rapidly heat to a temperature at which a catalytic conversion of pollutants ensues before and/or shortly after starting, by means of high currents.

I claim:

1. A honeycomb assembly, comprising a honeycomb body, said honeycomb body having: an interior, two end surfaces, cross-sectional regions and a cross-sectional plane;
   sheet metal layers having a structure for forming a multiplicity of channels through which a fluid can flow, said channels extending from one of said end surfaces to the other;
   insulating means subdividing said honeycomb body and extending from one of said end surfaces to the other for reducing electrical conductivity of said honeycomb body in each of said cross-sectional regions and developing at least one wound, electrically cohering conductive current path extending in said cross-sectional plane; and
   primarily metal support structures extending at least partly in said interior of said honeycomb body and retaining said sheet metal layers;
   said insulating means being at least one planar gap, and said support structures being disposed in said at least one planar gap, being stabilizers of said at least one planar gap, and extending at least intermittently parallel to said at least one planar gap.

2. The honeycomb assembly according to claim 1, wherein said honeycomb body has a given spacing between said end surfaces, and a diameter being greater than said given spacing.

3. The honeycomb assembly according to claim 1, wherein said insulating means are electrically insulating layers, and said support structures are carriers of said electrically insulating layers extending inside said electrically insulating layers.

4. The honeycomb assembly according to claim 1, wherein said insulating means include at least one planar gap and electrically insulating layers, and said support structures are stabilizers of said at least one planar gap extending at least intermittently parallel to said at least one planar gap and carriers of said electrically insulating layers extending inside said electrically insulating layers.

5. The honeycomb assembly according to claim 1, including first and second terminal contacts, said support structures each having a first part being electrically highly conductively connected to one another and to said first terminal contact and a second part being electrically highly conductively connected to one another and to said second terminal contact, and at least one current path extending through said sheet metal layers and directly electrically conductively connecting said first part to said second part.

6. The honeycomb assembly according to claim 1, including a jacket tube, said honeycomb body being disposed inside and electrically insulated from said jacket tube, and said sheet metal layers being directly mechanically connected to said jacket tube by said support structures.

7. The honeycomb assembly according to claim 6, wherein said support structures are passed through and electrically insulated from said jacket tube.

8. The honeycomb assembly according to claim 6, wherein said support structures are secured to said jacket tube.

9. The honeycomb assembly according to claim 6, wherein said support structures are passed through, electrically insulated from and secured to said jacket tube.

10. The honeycomb assembly according to claim 1, wherein said sheet metal layers are disposed substantially in at least one stack bent approximately in an S shape.

11. The honeycomb assembly according to claim 10, wherein said insulating means establish a resultant current path substantially at least once in approximately S shape following said at least one stack of sheet metal layers.

12. The honeycomb assembly according to claim 1, wherein said sheet metal layers in said interior of said honeycomb body are secured to and merge with said support structures.

13. The honeycomb assembly according to claim 1, wherein said sheet metal layers in said interior of said honeycomb body are secured to and merge with said support structures at angles other than 90°.

14. The honeycomb assembly according to claim 1, wherein said support structures have a local electrical resistance adapted to local current intensities to be absorbed, permitting individual subregions of said support structures to have different thicknesses.

15. The honeycomb assembly according to claim 1, wherein said support structures include gaps effecting an electrical subdivision in said interior of said honeycomb body and electrically insulating layers reinforcing the electrical subdivision in subregions.

16. The honeycomb assembly according to claim 15, wherein said electrically insulating layers are applied to at least one side of said support structures.

17. The honeycomb assembly according to claim 16, wherein said electrically insulating layers are flame-sprayed ceramic layers.

18. The honeycomb assembly according to claim 1, including first and second terminal contacts,
   said sheet metal layers of said honeycomb body being disposed in a stack having first and second ends, being wound approximately in an S shape and including said insulating means as a middle insulation,
   said support structures including first and second supporting connection structures,
   all of said sheet metal layers at said first end of said stack being electrically conductively joined together,
   one half of said sheet metal layers at said second end of said stack on one side of said middle insulation being connected to said first terminal contact through said first supporting connection structure, and
   the other half of said sheet metal layers at said second end of said stack on the other side of said middle insulation being connected to said second terminal contact through said second supporting connection structure.

19. The honeycomb assembly according to claim 18, wherein said sheet-metal layers include a middle layer formed by said stack, and said insulating means are a gap.

20. The honeycomb assembly according to claim 18, wherein said sheet-metal layers include a middle layer formed by said stack, and said insulating means are an electrically insulating layer.

21. The honeycomb assembly according to claim 18, wherein said sheet-metal layers include a middle layer parallel to said stack, and said insulating means are a gap.

22. The honeycomb assembly according to claim 18, wherein said sheet-metal layers include a middle layer parallel to said stack, and said insulating means are an electrically insulating layer.

23. The honeycomb assembly according to claim 18, including a jacket tube in which said honeycomb body is disposed, said support structures having a supporting bridging structure forming said electrically conductive joining of said sheet metal layers at said first end of said stack, and said supporting bridging structure being secured to said jacket tube in an electrically insulated fashion.

24. The honeycomb assembly according to claim 18, including a jacket tube in which said honeycomb body is disposed, said support structures having a supporting bridging structure forming said electrically conductive joining of said sheet metal layers at said first end of said stack, and said supporting bridging structure being supported on said jacket tube in an electrically insulated fashion.

25. The honeycomb assembly according to claim 1, wherein said support structures each enclose a plurality of said sheet metal layers in subregions forming a beak-like shape for electrical contacting.

26. The honeycomb assembly according to claim 1, including a jacket tube in which said honeycomb body is disposed, said support structures having reinforcement tabs at least in subregions, said reinforcement tabs protruding beyond at least one of said end surfaces of said honeycomb body without touching said at least one end surface, and each of said reinforcement tabs being electrically insulatingly supported on at least one of said jacket tube and others of said reinforcement tabs.

27. The honeycomb assembly according to claim 26, wherein said honeycomb body has an outer periphery, and said subregions are located far away from said outer periphery.

28. The honeycomb assembly according to claim 1, wherein said sheet metal layers are alternatingly disposed smooth sheet metal layers and corrugated sheet metal layers.

29. The honeycomb assembly according to claim 28, wherein said sheet metal layers are formed of high-temperature and corrosion-proof steel.

30. The honeycomb assembly according to claim 1, wherein said sheet metal layers are alternatingly disposed, differently corrugated or structured sheet metal layers.

31. The honeycomb assembly according to claim 1, wherein said honeycomb body has a coating of catalytically active material for cleaning exhaust gas.

32. The honeycomb assembly according to claim 1, wherein said honeycomb body has a coating of catalytically active material for cleaning exhaust gas of a motor vehicle having an Otto engine.

33. The honeycomb assembly according to claim 5, wherein said honeycomb body has an electrical resistance of 0.01 to 0.3Ω between said first terminal contact and said second terminal contact at 20° C.

34. The honeycomb assembly according to claim 5, wherein said honeycomb body has an electrical resistance of 0.025 to 0.1Ω between said first terminal contact and said second terminal contact at 20° C.

35. The honeycomb assembly according to claim 5, wherein said honeycomb body has an electrical resistance of approximately 0.02Ω between said first terminal contact and said second terminal contact at 20° C.

36. The honeycomb assembly according to claim 1, wherein at least some of said support structures are sheet metal layers having a thickness of 0.5 to 1.5 mm.

37. The honeycomb assembly according to claim 1, wherein at least some of said support structures are sheet metal layers having a thickness of approximately 1 mm.

38. The honeycomb assembly according to claim 1, wherein said support structures are sheet metal layers being constructed for lower local current intensity and having a thickness of from 0.2 to 0.8 mm.

39. The honeycomb assembly according to claim 1, wherein said support structures are sheet metal layers being constructed for lower local current intensity and having a thickness of approximately 0.5 mm.

* * * * *

UNITED STATES PATENT AND TRADEMARK OFFICE
CERTIFICATE OF CORRECTION

PATENT NO. : 5,411,711
DATED : May 2, 1995
INVENTOR(S) : Helmut Swars

It is certified that error appears in the above-identified patent and that said Letters Patent is hereby corrected as shown below:

On the title page,

Item (30) Foreign Application Priority Data should read as follows:

July 30, 1990        (EP)    Europe        PCT/EP90/01242

Signed and Sealed this

Twenty-first Day of April, 1998

Attest:

BRUCE LEHMAN

Attesting Officer      Commissioner of Patents and Trademarks